United States Patent [19]
Ikeda

[11] Patent Number: 5,479,973
[45] Date of Patent: Jan. 2, 1996

[54] PNEUMATIC TIRES

[75] Inventor: Hiromichi Ikeda, Tokyo, Japan

[73] Assignee: Bridgestone Corporation, Tokyo, Japan

[21] Appl. No.: 896,788

[22] Filed: Jun. 9, 1992

Related U.S. Application Data

[63] Continuation of Ser. No. 767,355, Sep. 30, 1991, abandoned, which is a continuation of Ser. No. 451,979, Dec. 18, 1989, abandoned.

[30] Foreign Application Priority Data

Dec. 29, 1988 [JP] Japan ................................ 63-331324

[51] Int. Cl.⁶ .................................................. B60C 11/13
[52] U.S. Cl. ................................ 152/209 B; 152/209 R
[58] Field of Search ............................ 152/209 R, 209 B

[56] References Cited

U.S. PATENT DOCUMENTS

| | | | |
|---|---|---|---|
| 2,971,552 | 2/1961 | Williams et al. | 152/209 B |
| 4,289,183 | 9/1981 | Abe et al. | 152/209 B |
| 4,423,760 | 1/1984 | Treves et al. | 152/209 R |
| 4,550,756 | 11/1985 | Hinkel | 152/209 R |
| 4,664,167 | 5/1987 | Kawakami et al. | 152/209 R |
| 4,840,211 | 6/1989 | Makino | 152/209 R |
| 4,977,942 | 12/1990 | Ochiai | 152/209 R X |
| 5,010,936 | 4/1991 | Numata et al. | 152/209 R |
| 5,024,260 | 6/1991 | Ochiai | 152/209 R |

FOREIGN PATENT DOCUMENTS

| | | | |
|---|---|---|---|
| 0194062 | 9/1986 | European Pat. Off. | 152/209 R |
| 61-202903 | 9/1986 | Japan | 152/209 B |

Primary Examiner—Mark A. Osele
Attorney, Agent, or Firm—Sughrue, Mion, Zinn, Macpeak & Seas

[57] ABSTRACT

A pneumatic tire for truck and bus comprises a tread portion having a lug pattern, wherein an intersection angle $\theta_1$ defined by a standard line segment passing a lug edge with an obtuse angle with respect to tread side edge and a meridional line passing the standard line segment satisfies an equation of $0°<\theta_1<35°$, and a lug groove wall located side the standard line segment in the lug is folded outward from a middle portion of a lug groove depth in the radial direction of the tire so as to enlarge the lug groove.

2 Claims, 3 Drawing Sheets

FIG_1

PNEUMATIC TIRES

This is a continuation of application Ser. No. 07/767,355, filed Sep. 30, 1991, now abandoned, which is a continuation of application Ser. No. 07/451,979, filed Dec. 18, 1989, now abandoned.

BACKGROUND OF THE INVENTION

1. Field of the Invention

This invention relates to pneumatic tires having a lug pattern, and more particularly to a pneumatic tire capable of effectively preventing the occurrence of uneven wear when the tire is used as a heavy duty tire for vehicles such as truck and bus.

2. Related Art Statement

In the conventionally known generic lug type tires, in order to overcome plysteer force generated due to stretch deformation of an outermost belt layer in a bias belt, lugs are frequently arranged in a slant posture oppositely arranged in a direction of extending cords of the outermost belt layer with respect to an equator of the tire.

In FIG. 5 is shown an embodiment of a prior art tread pattern in this type of the tire. This tire comprises plural lugs 33 in each side end part of a tread portion 31, which are defined by lug grooves 32 arranged in each side end part of the tread portion 31 and inclined in a certain direction with respect to an equator X—X of the tire.

When the lugs are arranged in a posture of upward to the right as shown in FIG. 5, cords of an outermost belt layer in a bias belt located inside the tread rubber are extended in a posture downward to the right as shown by a phantom line in FIG. 5, and consequently the occurrence of plysteer force is effectively prevented.

In the ground contact area of this tire, however, reaction forces $F_1$, $F_2$ result from the squeezing out of the tread rubber at edges 33a and 33b in circumferential direction of each lug 33 in directions perpendicular to the extending directions of these edges. The reaction forces $F_1$ and $F_2$ are divided into components of force $F_{1c}$, $F_{2c}$ facing each other in the circumferential direction of the tire and components of force $F_{1w}$, $F_{2w}$ directing inward and outward in the widthwise direction of the tire. On the other hand, when the tire is turned, since the tread portion 31 is subjected to a large external force inward in the widthwise direction of the tire, such an inward external force is effectively offset at the edge 33b of the lug 33 producing the outward component of force $F_{2w}$ in the widthwise direction of the tire, specifically the edge 33b forms an acute intersection angle with respect to a side edge 31a of the tread portion 31 among the edges 33a and 33b of the lug 33 in circumferential direction of the tire, the inward component of force $F_{1w}$ in the widthwise direction of the tire acts at the edge 33a opposing to the edge 33b in a direction of increasing the magnitude of inwardly external force, and consequently there is caused a problem of considerably wearing the edge 33a and the neighborhood thereof.

SUMMARY OF THE INVENTION

It is, therefore, an object of the invention to advantageously solve the aforementioned problems of the conventional technique and to provide a pneumatic tire in which the above uneven wear in lug portion is effectively prevented by increasing amount deformation amount of that portion of the lug which is largely worn.

According to the invention, there is the provision of a pneumatic tire provided with lugs inclined in a certain direction with respect to an equator of the tire, characterized in that at a side of a lug edge forming an obtuse intersection angle with respect to each side edge of a tread portion among lug edges of each lug in the circumferential direction of the tire, an intersection angle $\theta_1$ defined by a standard line segment connecting an intersect between said lug edge and said tread side edge to an intersect between said lug edge and a line segment located at a position corresponding to ¼ of a tread width and in parallel with said tread side edge and a meridional line passing said standard line segment satisfies the relationship $0°<\theta_1<35°$, and a wall of a lug groove located at a side of said standard line segment in a section viewed in a direction perpendicular to an extending direction of said lug groove defining said lug is folded outward from a middle portion of a depth of said lug groove in the radial direction of the tire so as to enlarge said lug groove.

In a preferred embodiment of the invention, the folded point of the wall of the lug groove is located from the bottom of the lug groove at a position corresponding to ¼–¾ of the depth of the lug groove.

In another preferred embodiment of the invention, the wall of the lug groove located at the side of the standard line segment satisfies $3°<\beta-\alpha<30°$ when: is $\alpha$ an intersection angle of a portion of the lug groove wall located inward from the folded point in the radial direction of the tire with respect to a radial line segment from a center of the tire and $\beta$ is an intersection angle of a portion of the lug groove wall located outward from the folded point in the radial direction of the tire with respect to the radial line segment from the center of the tire.

BRIEF DESCRIPTION OF THE DRAWINGS

The invention will be described with reference to the accompanying drawings, wherein.

DESCRIPTION OF THE PREFERRED EMBODIMENTS

In the pneumatic tire according to the invention, the intersection angle $\theta_1$ between the standard line segment and the meridional line in each of the lugs is limited to $0°<\theta_1<35°$, whereby the occurrence of plysteer force is effectively prevented. Also the occurrence of uneven wear such as so-called heel and toe wear, shoulder wear or the like can sufficiently be prevented.

Furthermore, the wall of the lug groove located at the side of the standard line segment in the section viewed in a direction perpendicular to the extending direction of the lug groove defining the lug is folded outward from the middle portion of the lug groove depth in the radial direction of the tire so as to enlarge the lug groove. The reaction force of the lug edge at the side of the standard line segment and the neighborhood thereof at the ground contact state of the lug can effectively be reduced on the basis of a large elastic deformation of the tread rubber toward the inside of the lug groove under the action of the folded portion, consequently wear at the tread surface is reduced and the premature wearing of the lug edge and the neighborhood thereof is effectively prevented.

In this case, when the folded point is located from the bottom of the lug groove within a range of ¼–¾ of the depth of the lug groove, more effective prevention of premature wearing can be realized.

Furthermore, the elastic deformation amount of the tread rubber inside the lug groove becomes particularly large within $3°<\beta-\alpha<30°$ when $\alpha$ is an intersection angle of a portion of the lug groove wall located inward from the folded point in the radial direction of the tire with respect to a radial line segment from a center of the tire, accurately intersection angle at the folded point and $\beta$ is an intersection angle of a portion of the lug groove wall located outward from the folded point in the radial direction of the tire with respect to the radial line segment from the center of the tire. The intersection angle at the surface of the tread portion. As a result, it is confirmed that the uneven wear of the lug can be prevented more effectively.

Figure 1:
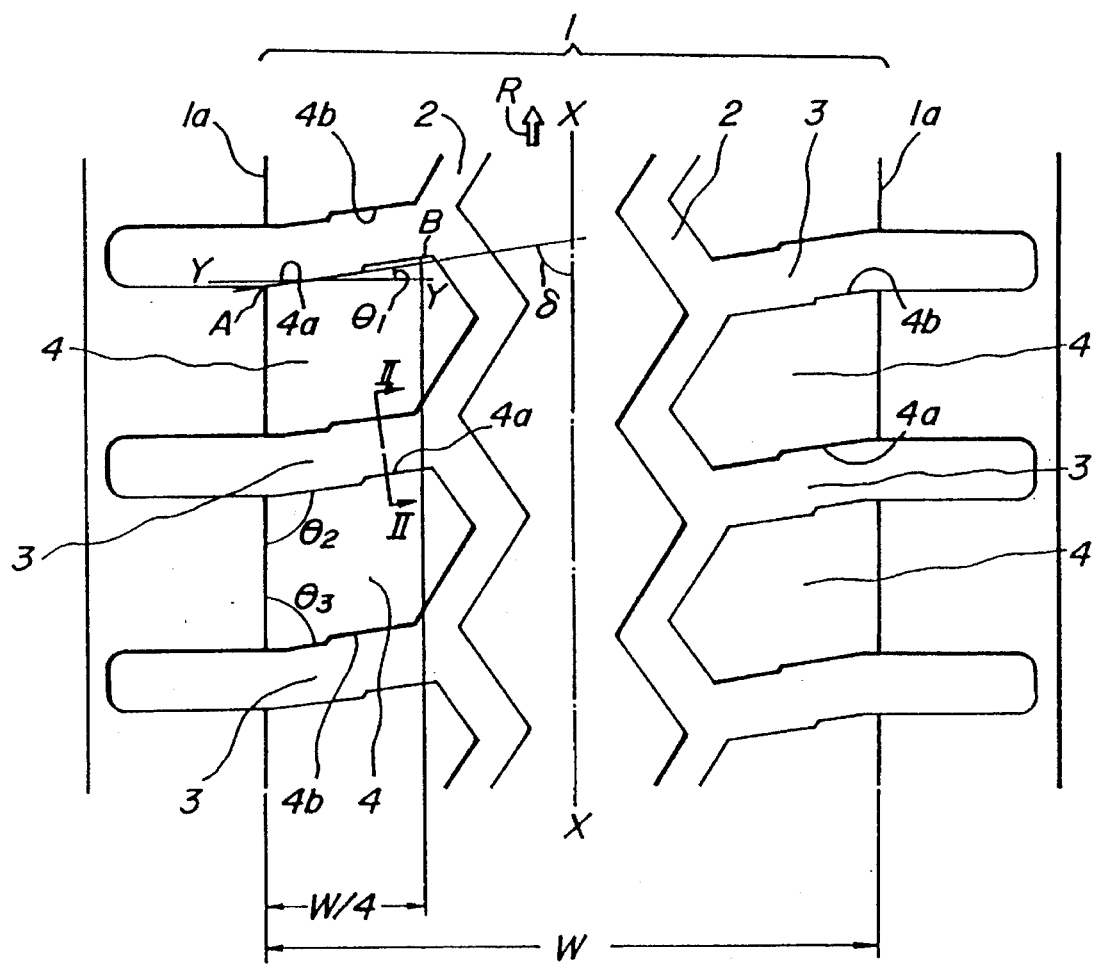
FIG. 1 is an embodiment of tread pattern in the pneumatic tire according to the invention.

FIG. 1 illustrates a tread pattern in an embodiment of the pneumatic tire according to the invention. Moreover, the inner structure of the tire is a generic radial structure, so that the illustration thereof is omitted.

Numeral 1 is a tread portion forming a ground contact area of the tire, numeral 1a each side edge of the tread portion 1, numeral 2 a main groove formed in the tread portion 1 and extending zigzag in the circumferential direction of the tire, and numeral 3 a lug groove extending from the side edge 1a of the tread portion 1 to the main groove 2.

In this case, the lug grooves located at a given interval in the circumferential direction of the tire define plural lugs 4 arranged in each side end part of the tread portion 1 and inclined in a certain direction with respect to the equator X—X of the tire together with each of the main groove 2. Each of the lugs 4 located in a left half portion of FIG. 1 is inclined toward a front side in a rotating direction of the tire shown by an arrow R and each of the lugs 4 located in a right half portion is inclined toward a back side in the rotating direction of the tire.

The inclination angle of each of the lugs 4 with respect to the equator X—X of the tire may be represented by replacing with an intersection angle of the lug 4 to a meridional line of the tire. The intersection angles of lug edges 4a and 4b of each lug 4 in the circumferential direction of the tire with respect to the side edge 1a of the tread portion 1 are $\theta_2$ and $\theta_3$. An intersection angle $\theta_1$ defined by a standard line segment A-B connecting an intersect A between the lug edge 4a having a large intersection angle $\theta_2$ and the tread side edge 1a to an intersect between the lug edge 4a and a line segment located at a position B corresponding to ¼ of a tread width W and in parallel with the tread side edge 1a and a meridional line Y—Y passing the standard line segment A-B is within a range of $0°<\theta_1<35°$. In the illustrated embodiment, the intersection angle $\theta_1$ is about 8°. Therefore, an intersection angle $\delta$ of the standard line segment A-B with respect to the equator X—X of the tire is within a range of $55°<\delta<90°$.

Figure 2:
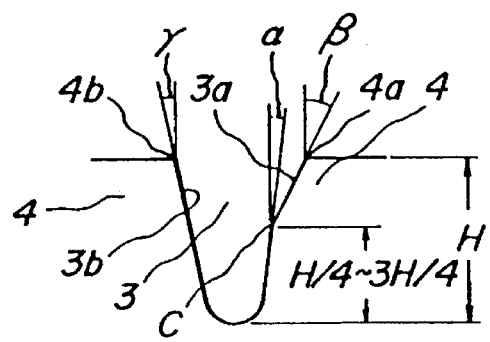
FIG. 2 is a laterally sectional view of a lug groove taken along a line II—II of FIG. 1.

In order to solve the problem inherent to the case that the lugs are extended as mentioned above, according to the invention, viewing a section of the lug groove 3 in a direction perpendicular to the extending direction of the lug groove, as shown in FIG. 2, a wall 3a of the lug groove 3 located side the standard line segment A-B is folded outward from a middle portion of a depth of the lug groove in the radial direction of the tire so as to enlarge the lug groove 3. Preferably, the folded point C is located from the bottom of the lug groove 3 within a range of ¼–¾ of a lug groove depth H.

Figure 3:
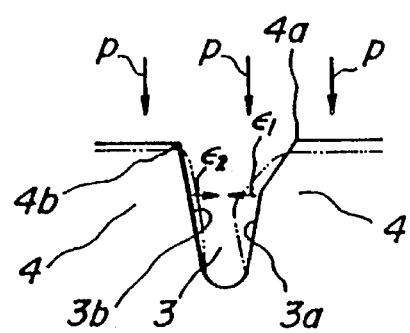
FIG. 3 is a schematic view illustrating a deformation behavior of the lug groove.

That is, when the folded point C is within the above range, if the lug 4 is subjected to a pressure P in a direction of crushing compressing of the lug during the contacting with ground as shown in FIG. 3, an escaping amount $\epsilon_1$ of the lug 4 and hence lug groove wall 3a toward the inside of the lug groove can be made larger than an escaping amount $\epsilon_2$ of the opposed lug groove wall 3b. Thus, the reaction force of the lug edge 4a and the neighborhood thereof at the ground contact state is made smaller than that of the lug edge 4b, so that the occurrence of premature wearing of the lug edge 4a and the neighborhood thereof is very effectively prevented. In other words, when the folded point C is located inward from the position of ¼H or outward from the position of ¾H in the radial direction, the movement of the lug groove wall 3a toward the inside of the lug groove is insufficient and the occurrence of premature wearing can not be prevented to a satisfactory extent.

As shown in FIG. 2, when an $\alpha$ intersection angle of a portion of the lug groove wall 3a is located inward from the folded point C in the radial direction of the tire with respect to a radial line segment from a center of the tire, accurately intersection angle at the folded point C. An intersection angle $\beta$ of a portion of the lug groove wall 3a located outward from the folded point C in the radial direction of the tire with respect to the radial line segment from the center of the tire, accurately intersection angle at the surface of the tread portion. The relation between $\alpha$ and $\beta$ is $3°<\beta-\alpha21 30°$. Moreover, the intersection angles $\alpha$ and $\beta$ can be varied within $0°<\alpha<20°$ and $5°<\beta<45°$, respectively. On the other hand, an intersection angle $\gamma$ of the opposed lug groove wall 3b with respect to the radial line segment from the center of the tire at the surface of the tread portion can be varied, for example, within a range of $5°<\gamma<25°$.

Figure 4:
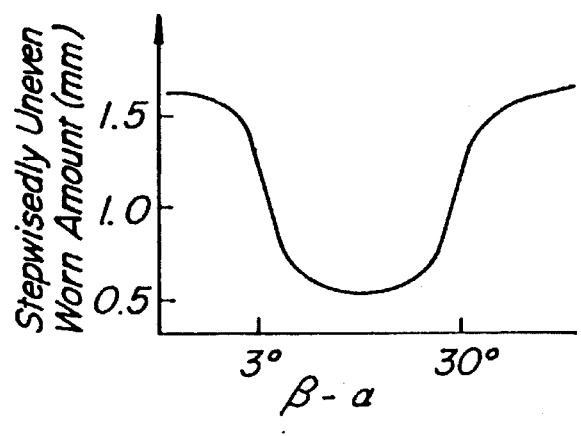
FIG. 4 is a graph showing a stepwisedly uneven worn amount.

The reason why the difference between the intersection angles ($\beta-\alpha$) is limited to the above range is based on the fact that when the intersection angle difference $\beta-\alpha$ is varied at the intersection angle $\gamma$ of 15°, the wear amount of the lug edge 4a and the neighborhood thereof becomes smallest within $3°<\beta-\alpha<30°$ as seen from the graph of FIG. 4.

The following examples are given in illustration of the invention and are not intended as limitations thereof.

The wear degree was measured with respect to two test tires having the following dimensions.

TIRE DIMENSIONS (1) Size: TBR 10.00R20

(2) Invention tire

The tire had a tread pattern shown in FIG. 1, in which the position of the folded point was ½H, the intersection angle difference $\beta-\alpha$ was 20°, and $\alpha=10°$, $\beta=30°$ and $\gamma=16°$.

(3) Conventional tire

Figure 5:
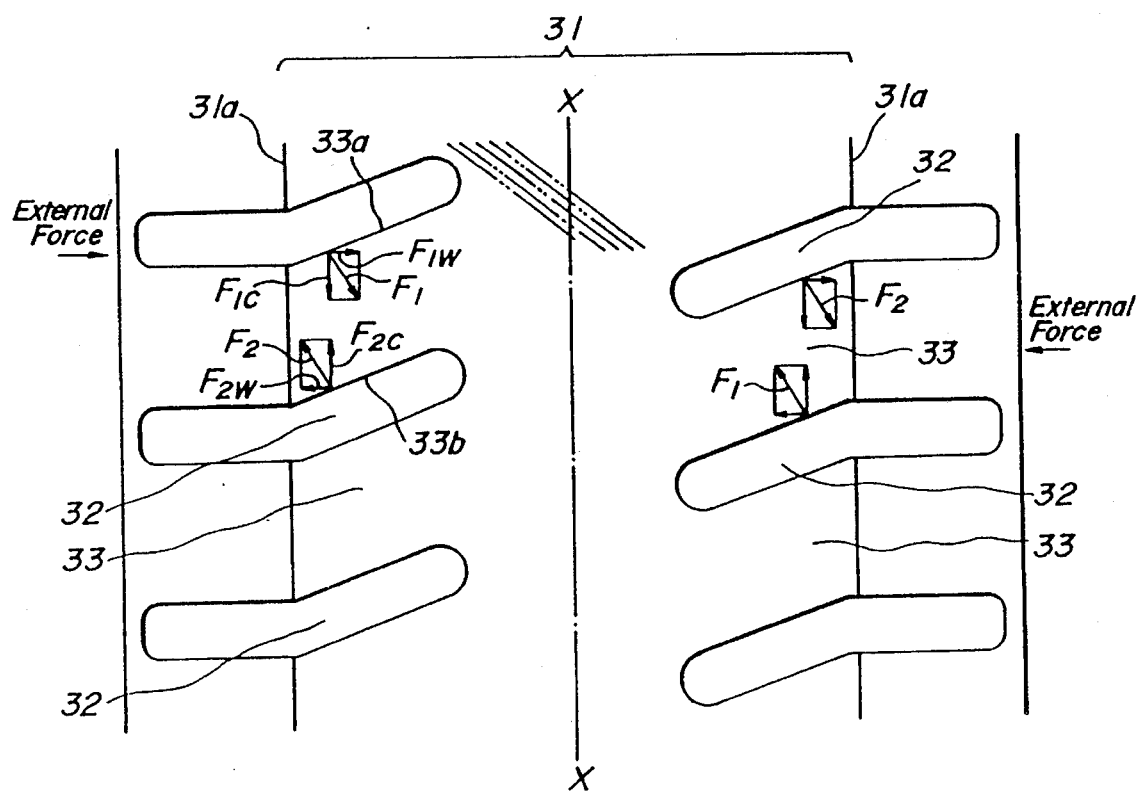
FIG. 5 is a tread pattern in the conventional tire.

The tire had a tread pattern shown in FIG. 5, in which the intersection angle $\theta_1$ between standard line segment A-B and meridional line Y—Y was 20° and intersection angle $\alpha=\beta=\gamma=16°$.

TEST METHOD

Vehicle: 10 t truck under a load of 10 tons

Internal pressure of tire: 7.25 kgf/cm$^2$

Tire mount position: all wheels (ten tires)
Running distance: 20,000 km

|  | Test results | |
| --- | --- | --- |
|  | Invention tire | Conventional tire |
| Heel and toe worn amount (average of 10 tires) | 0.5 mm | 2.5 mm |
| Shoulder worn width | 2.0 mm | 4.5 mm |

As mentioned above, according to the invention, not only is the occurrence of plysteer force effectively prevented, but also the occurrence of uneven wear such as heel and toe wear, shoulder wear or the like can sufficiently be prevented and the peculiar wear accompanied with such uneven wear can be prevented very effectively.

What is claimed is:

1. A pneumatic radial tire comprising; a tread provided with lugs inclined with respect to an equator of the tire and in opposition to direction of cords constituting an outermost belt layer and having a point-symmetrical tread pattern, a side of a lug edge forming an obtuse intersection angle with respect to each side edge of a tread portion among lug edges of each lug in the circumferential direction of the tire, an intersection angle $\theta$, being defined by a standard line segment defined by connecting an intersect point between said lug edge and said tread side edge to an intersect point between said lug edge and a line segment located at a position corresponding to ¼ of a tread width and in parallel with said tread side edge and a meridional line passing said standard line segment, wherein, $0°<\theta<35°$, and a wall of a lug groove located at a side of said standard line segment in a section viewed in a direction perpendicular to an extending direction of said lug groove defining said lug is tapered outward from a middle portion of a depth of said lug groove in the radial direction of the tire so as to enlarge said lug groove and each of said lug grooves is opened at said tread edge; wherein said lug groove wall located at the side of the standard line segment satisfies $3°<\beta-\alpha<30°$ when an intersection angle of a portion of the lug groove wall located inward from a point where said tapered lug groove wall begins in the radial direction of the tire with respect to a radial line segment from a center of the tire is $\beta$ and an intersection angle of a portion of the lug groove wall located outward from the point in the radial direction of the tire with respect to the radial line segment from the center of the tire is $\beta$, and wherein said intersection angles $\alpha$ and $\beta$ are within $0°<\alpha<20°$ and $5°<\beta<45°$, respectively.

2. The pneumatic tire according to claim 1, wherein said tapered lug groove wall begins at a position from the bottom of said lug groove corresponding to ¼–¾ of a lug groove depth.

* * * * *